United States Patent [19]
Kizhnerman et al.

[11] Patent Number: 6,062,767
[45] Date of Patent: May 16, 2000

[54] STORM WATER RECEPTOR SYSTEM

[76] Inventors: Samuil Kizhnerman, 19 Blythe Pl. Staten Island, New York, N.Y. 10306; Michael J. Calise, 36 Stratford Pl., New York, N.Y. 10956

[21] Appl. No.: 09/246,298

[22] Filed: Feb. 8, 1999

Related U.S. Application Data

[60] Provisional application No. 60/075,600, Feb. 9, 1998.
[51] Int. Cl.[7] ................................................ B01D 21/02
[52] U.S. Cl. ........................... 405/39; 405/36; 404/2; 404/4; 210/532.1; 210/521; 210/170
[58] Field of Search ................................ 405/36, 39, 40, 405/41, 52, 53, 60; 404/2, 3, 4; 210/513, 521, 522, 532.1, 532.2, 538, 540, 170

[56] References Cited

U.S. PATENT DOCUMENTS

| | | | |
|---|---|---|---|
| 712,194 | 10/1902 | Kelly | 404/4 |
| 5,004,534 | 4/1991 | Buzzelli | 210/532.1 |
| 5,192,156 | 3/1993 | Webb | 404/4 |
| 5,498,331 | 3/1996 | Monteith | 210/532.1 |
| 5,725,760 | 3/1998 | Monteith | 210/532.1 |
| 5,849,181 | 12/1998 | Monteith | 210/532.1 |

*Primary Examiner*—Eileen Dunn Lillis
*Assistant Examiner*—Frederick L. Lagman
*Attorney, Agent, or Firm*—Donald C. Simpson

[57] ABSTRACT

A storm water receptor having at least one inlet and an outlet positioned at a discharge level lower than the level of the intake provided with a novel, removable divider which divides the receptor into an upper chamber and a lower chamber, having a float-actuated trap door that permits water entering the upper chamber of the catch basin or field inlet to be diverted and flow into the lower chamber until the lower chamber is filled with liquid, at which point the entrance into the lower chamber closes, and water entering the upper chamber passes directly out of the upper chamber through the discharge pipe. In an alternative embodiment of the invention, the float-activated trap door can be replaced with a stationary, removable plate or ramp.

8 Claims, 4 Drawing Sheets

STORM WATER RECEPTOR SYSTEM

This application claims the benefit of U.S. Provisional No. 60/075,600 filed Feb. 9, 1998.

This invention relates to storm water receptors of the catch basin field inlet and/or drainage manhole type which are adapted to separate and entrap oil or gasoline-based materials and suspended solids that may be swept up by the initial rush of storm water, such that the water fraction may be discharged into municipal receiving sewers with minimum environmental impact.

U.S. Pat. No. 4,136,010 to Pilie, et al, relies on a system of troughs and recovery tanks, and apparently involves substantial manual operation. A potential use for this invention is for intercepting the initial storm runoff from drainage areas such as city streets, parking lots, highways, et cetera. It is known that the initial runoff from such areas contains higher concentrations of pollutants than runoff which occurs at later stages in the storm, and that it would be desirable in some cases to intercept the initial runoff and divert it to a treatment system. It is impractical in most cases to divert all storm runoff to a treatment system because in persistent heavy rain the treatment system is overloaded and even normal waste water is flushed in almost raw form into receiving waters.

By use of the trough interceptors in the catch basins and the adjustment of the acceptance rate of the interceptor drain, it is possible to limit the amount of water diverted to the treatment system to that amount which can be safely handled by the treatment system. By installation of a surge or retention tank between the interceptor and the device used to adjust acceptance rate of the drain (e.g. a valve), it is assured that the initial runoff is always accepted into the treatment system.

Prior art devices of this kind are typically equipped with various baffles and chambers operating in such a way as to collect specific components of the waste fluid and separate them from others.

An improved construction is described in U.S. Pat. No. 4,985,148, issued Jan. 15, 1991 to Joseph G. Monteith, and entitled "improved Separator Tank Construction." The purpose of the tank interceptor set forth in the latter patent is to provide two distinct responses to two different operating conditions. When the materials entering the interceptor include discharge from a service station, garage, machine shop, factory or the like, or oil that has spilled accidentally, these non-aqueous materials are collected within the interceptor. The aqueous fraction is allowed to leave the interceptor and pass on to a storm sewer or the like, but the liquid fraction made up of oil or fat of animal, vegetable or mineral origin, gasoline and the like remains trapped within the interceptor until the same is pumped out. Further, any heavier-than-water materials sink to the bottom of the interceptor and are confined to a particular location where they can be pumped out at intervals. This interceptor is also adapted to deal with inflow resulting from heavy rain during a storm. Such inflow would typically be a combination of storm drainage from an adjacent industrial property, garage or the like, as well as inflow from storm drains adapted to catch rainwater. When a large quantity of rainwater arrives at the interceptor, the interceptor automatically diverts most of this flow directly to an outlet opening which passes it directly to a storm sewer. Only a portion of the flow of the incoming rainwater is allowed through the treatment/storage chamber of the interceptor.

The Monteith separator provides, within the tank-like interceptor, a passageway extending substantially directly between the inlet and the outlet. The passageway is essentially sealed from communication with the remainder of the interior of the tank interceptor, except for an opening adjacent the inlet and an opening adjacent the outlet. Each opening connects the passageway with the remainder of the tank interior, described as a "treatment chamber." A weir is provided within the passageway, disposed with respect to the first opening such that, under relatively low entry flow rates, all entering materials are contained by the weir and flow through the first opening into the treatment chamber, whereas under relatively high entry flow rates, part of the entering materials overflow the weir and are delivered by the passageway to the outlet.

In later work, Monteith concludes that it is not necessary for the entire volume inside the interceptor tank (except for the passageway means) to be used as a treatment chamber. He also considered it desirable that the high-flow passageway be more fully accessible to personnel wishing to inspect the installation for damage, improper accumulations of materials, etc. Accordingly, he redesigned his interceptor to include a separator tank construction having a treatment compartment in the bottom portion thereof and a convenient area where inspection personnel may stand, with these two volumes being separated from each other in an air-tight manner.

Thus, in U.S. Pat. No. 5,498,331, Monteith provided a tank interceptor for rainwater and waste-water, comprising: a container including a bottom wall, a side wall and a top wall defining an internal chamber with a partition dividing the chamber into a by-pass compartment above the partition and a treatment compartment below the partition with an inlet through the side wall adjacently above the partition adapted to permit liquid to flow into the by-pass compartment, and an outlet through the side wall adjacently above the partition and spaced away from the inlet adapted to permit liquid to flow out of said by-pass compartment. The top of the partition is configured to include a raised portion, similar to the weir of his earlier patent, which isolates the inlet from the outlet, such that liquid entering through the inlet and seeking to reach the outlet through the by-pass compartment must overflow the raised portion in order to do so. Openings are provided in the partition on the inlet side and the outlet side of the raised portion, but communicate with each other through the by-pass compartment. The openings are such that liquid, without having to overflow said raised portion, can travel from the inlet to the outlet by passing through the first opening into the treatment compartment, through the treatment compartment, and out again through the second opening into the by-pass compartment to the outlet.

SUMMARY OF THE PRESENT INVENTION

The present invention provides an advanced grit-oil separator for storm water designed to address federal, state, and local storm water regulations, designed to protect environmentally sensitive areas and coastal zones, and to prevent hazardous material spills such as oil, gasoline, and other similar liquids from entering local creeks, lakes, et cetera. It is also designed to isolate and separate grit materials which become entrained in storm water; the storm water effluent from this advanced grit-oil separator is of improved water quality. Unlike the majority of the prior art devices which require a storm water interceptor, in addition to and separate from the catch basins and field inlets, the advanced grit-oil separator of the present invention can be included as an integral part of a catch basin or of a field inlet.

In its simplest terms, the present invention consists basically of a storm water receptor, e.g., a catch basin or field inlet or drainage manhole, having at least one inlet and an outlet positioned at a discharge level lower than the level of the intake except that a portion of the catch basin beneath the discharge pipe is considerably larger than in the standard catch basin or field inlet; a novel, removable divider is provided which divides the catch basin or field inlet into an upper chamber and a lower chamber, having a floatactuated trap door that permits water entering the upper chamber of the catch basin or field inlet to be diverted and flow into the lower chamber until said lower chamber is filled with liquid, at which point the entrance into the lower chamber closes, and water entering the upper chamber passes directly out of the upper chamber through the discharge pipe. In an alternative embodiment of the invention, the float-activated trap door can be replaced with a stationary, removable plate or ramp. In this case, when the lower chamber is full, incoming water will flow directly to and through the discharge pipe. All of this is accomplished without the need for a weir, wall, or other restrictor between the inlet and outlet of the catch basin or field inlet.

DETAILED DESCRIPTION OF THE DRAWINGS AND OF THE PREFERRED EMBODIMENT OF THE PRESENT INVENTION

While the present invention can be utilized in either a catch basin design or a field inlet design, it will be described hereinafter in its preferred embodiment in a catch basin. It will be apparent however, considering the description and drawings, that it will work equally well with a field inlet. A catch basin is essentially a storm water receptor with one or more inlet pipes and generally only a single outlet pipe connected to a municipal storm sewer system. The catch basin additionally has an overhead ground level inlet with a curb piece such as the typical grating seen along the edges of most roads. A field inlet differs from a catch basin primarily in that water access is through a ground level opening or grating, but does not have the curb piece normally associated with catch basins. A drainage manhole is essentially a storm water receptor without a ground level inlet or grating, only subsurface inlet pipes to carry water into the receptor. For the purposes of the present disclosure and claims, the term storm water receptor will be used generically to include field inlets, catch basins and drainage manholes, and this includes receptors which have either ground level water inlets or subterranean water pipe inlets, or both. The key design elements in these storm water receptors are that the bottom of the discharge line or outlet must be lower than the level at which storm water enters the receptor and that the internal volume of the receptor below the discharge line, or outlet, should be great enough to hold the anticipated initial surge of storm water expected to be discharged into the storm water receptor. This volume measurement typically is approximately the volume of water that will flow into the receptor from the one-half inch of rain from a storm.

Figure 1:
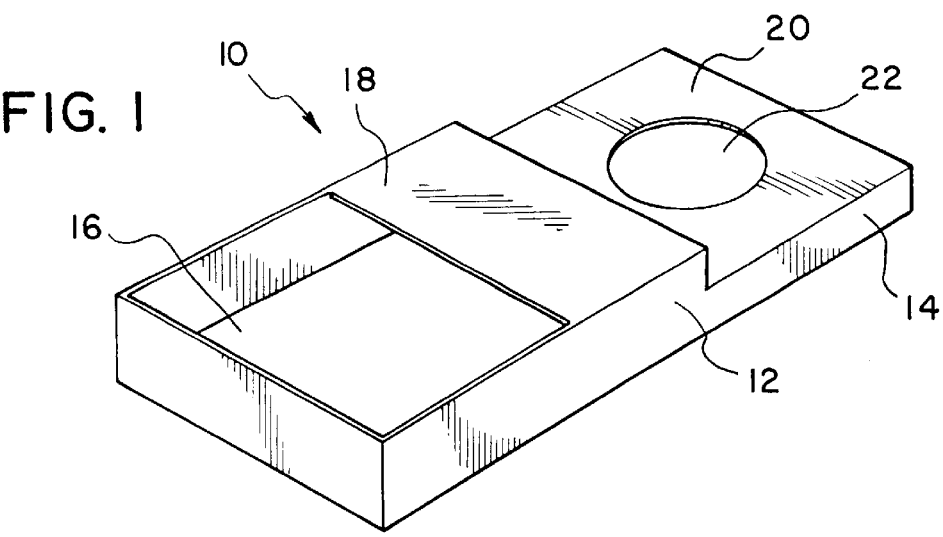
FIG. 1 is a perspective view of the base portion of the divider of the present invention.

With reference to FIGS. 1 through 7, the advance grit oil separator comprises a divider or partition identified generally as 10 in the drawings, made up of two or more steps, a first, higher step 12, and a second, lower, step 14. As can be seen in FIG. 1, the advanced grit oil separator has an open region 16 and a closed region 18 defining the upper portion of the first or higher step 12 and the upper portion of the second, or lower step 14, is covered by surface 20. In FIG. 1, lower closure surface 20 is provided with an opening 22 for the out flow of cleaned water. Opening 16, as shown in FIG. 1, extends completely through divider 10.

Figure 2:
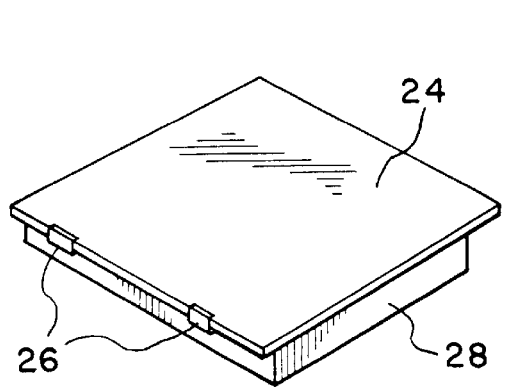
FIG. 2 is a perspective view of the trap door used with the divider of the present invention.
Figure 3:
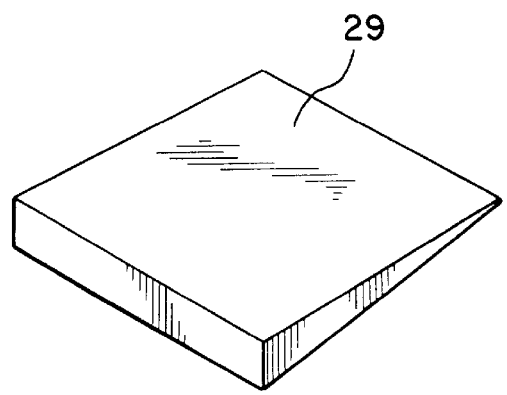
FIG. 3 is a perspective view of an alternative to the trap door of FIG. 2.
Figure 4:
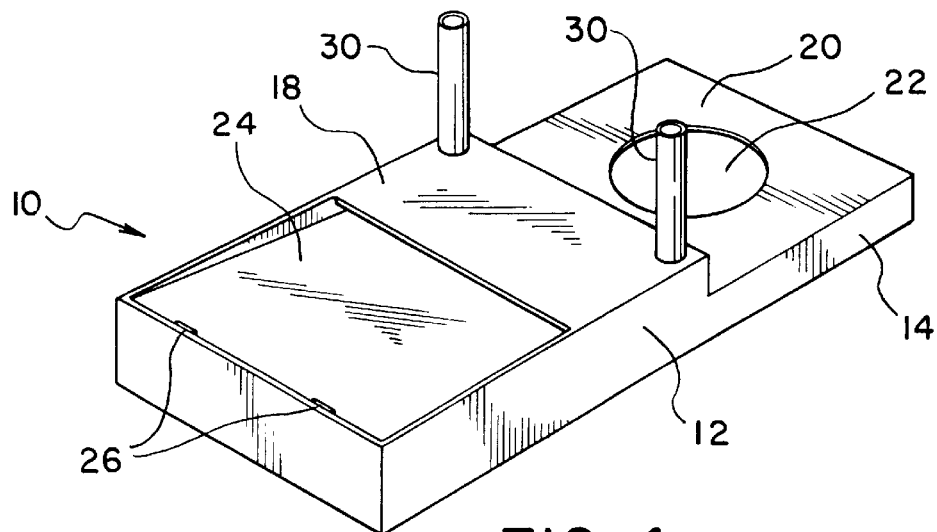
FIG. 4 is a perspective view of a divider of the present invention combining the base portion of FIG. 1 and the trap door of FIG. 2.

As shown in FIGS. 1 through 8, divider 10 is provided with a hinged trap door 24 which can be hinged at a pair of pivot points 26 at the top rear of step 12 (see FIG. 4). As illustrated in FIGS. 1 through 8, the trap door 24 is positioned in a normally open position, i.e. the edge of the trap door nearest surface 18 is normally positioned below surface 18 such that any liquid landing on trap door 24 will tend to flow downward below surface 18. In general, the side walls of divider 10 are provided with "stops" or limiters to restrict the declination of trap door 24 to about 30 degrees or less to minimize churning or mixing of the storm water that has accumulated in the lower part of the storm water receptor.

Figure 5:
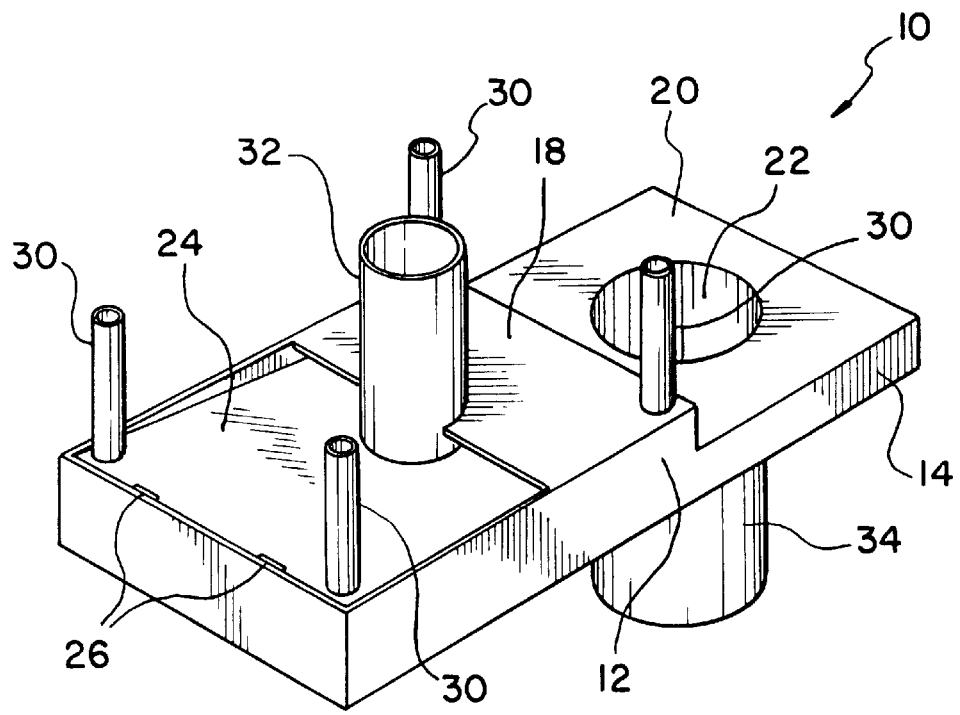
FIGS. 5 and 6 are the same as FIG. 4, but with some optional modifications shown and with some invisible lines shown for ease of understanding the drawings in FIG. 6.
Figure 6:
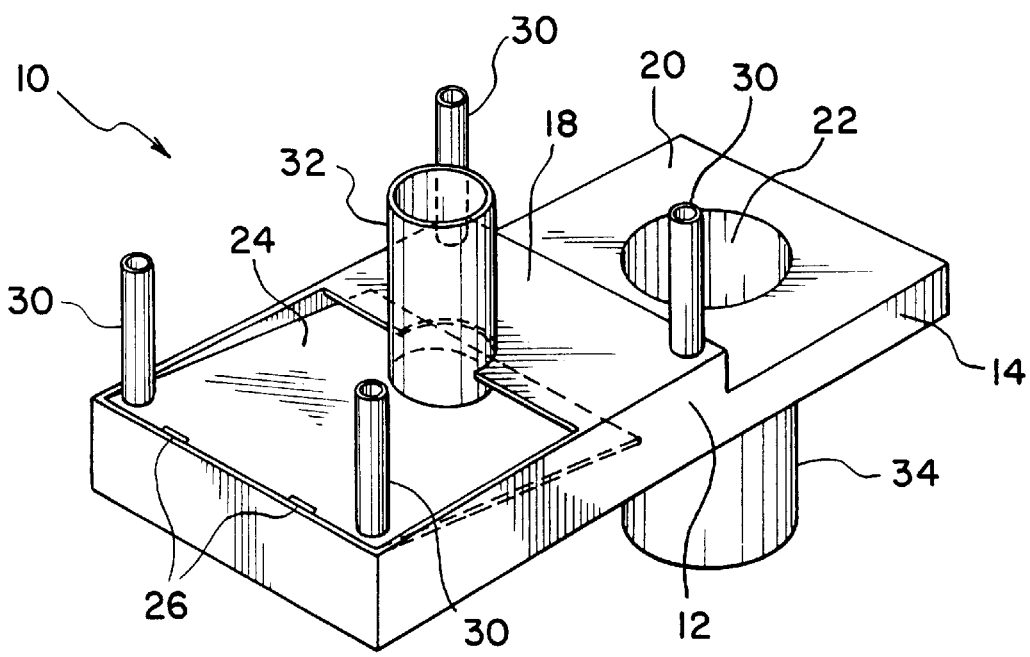
Figure 7:
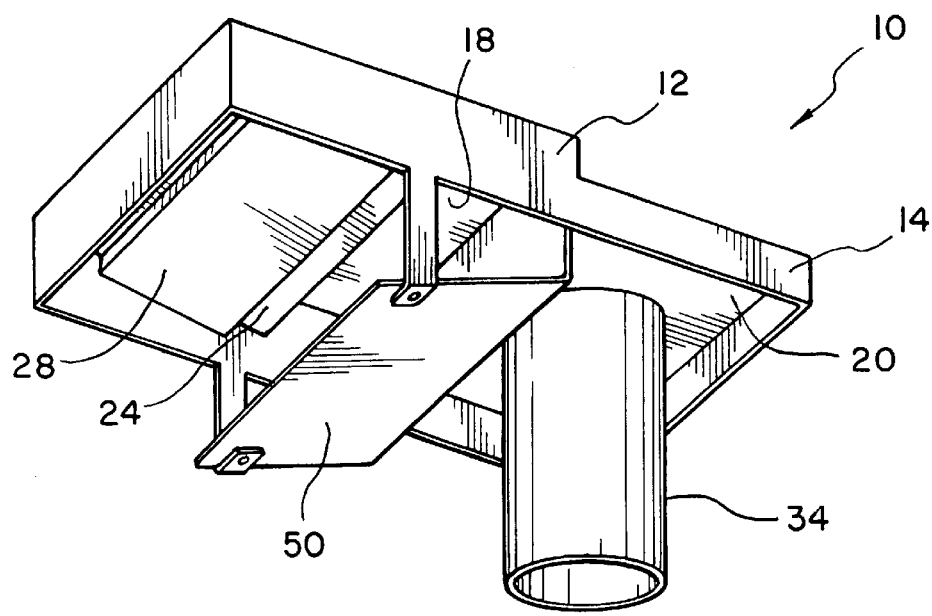
FIG. 7 is a perspective view of the underside of a version of the divider of FIG. 4.
Figure 8:
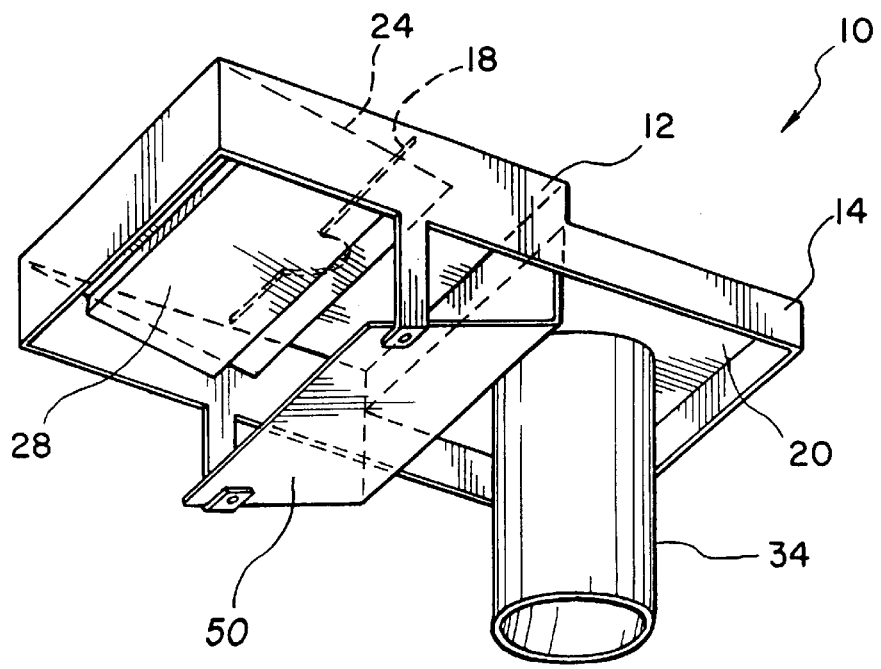
FIG. 8 is the same as FIG. 7 with some invisible lines shown for clarity.

As can be seen in FIGS. 2, 7, and 8, a float 28 is affixed to the underside of trap door 24. When divider 10 is positioned in a normal upright position, as generally shown in FIGS. 4, 5 and 6, float 28 causes trap door 24 to move upward until the lip or edge of trap door 24 is in contact with the edge or lip of surface 18 under the effect of rising liquid. This will be explained in greater detail with respect to FIGS. 9 and 10.

Referring again to FIG. 1, divider 10 is provided with opening 22 through surface 20 in second or lower step 14. As is shown in FIGS. 5 and 6, this opening is provided with an extender conduit 34, the purpose of which will be best understood by the description of FIGS. 9 and 10.

Figure 9:
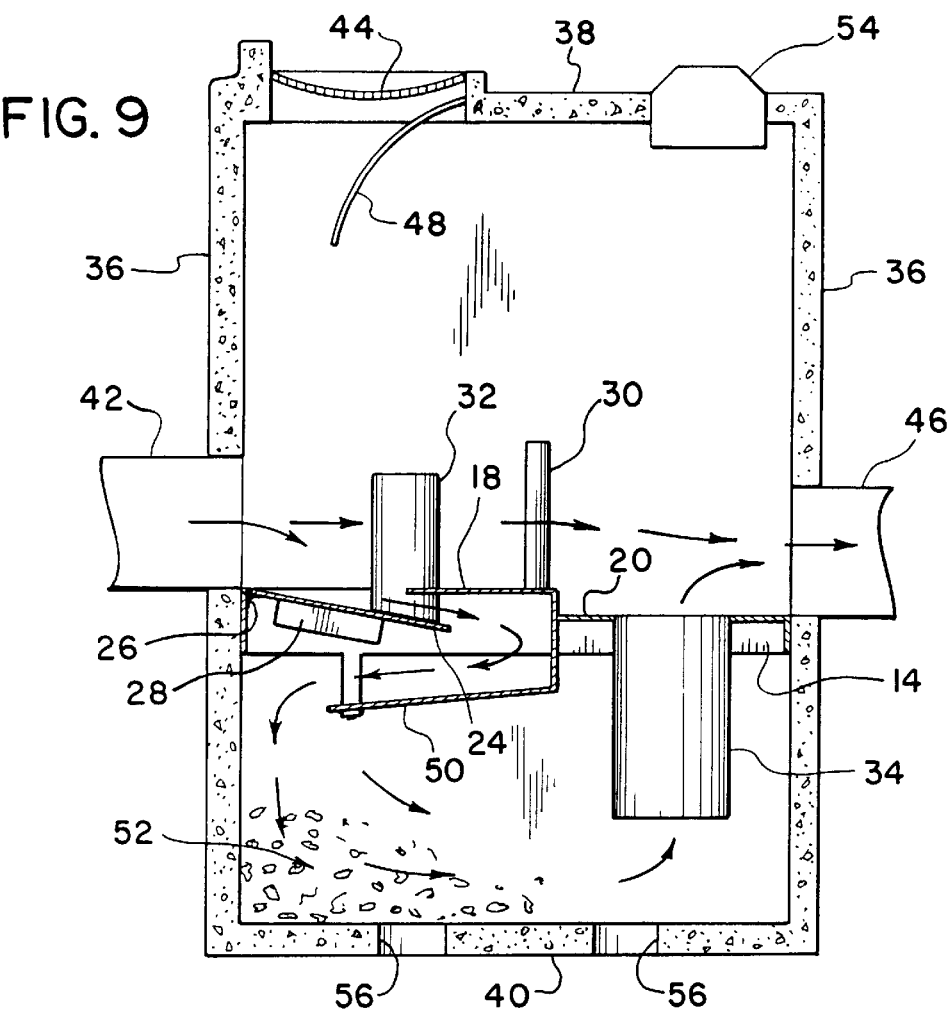
FIG. 9 is a vertical section through the center of a catch basin equipped with a divider in accordance with the present invention.
Figure 10:
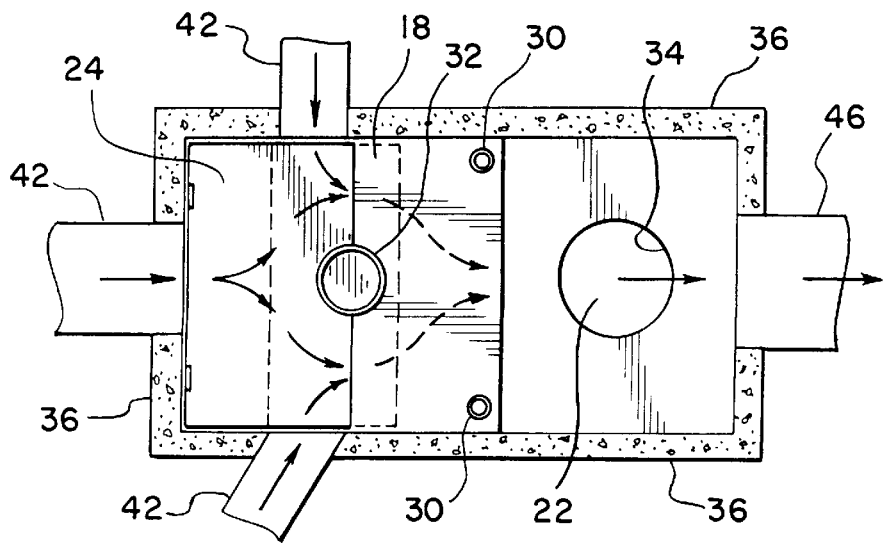
FIG. 10 is a horizontal section through the catch basin of FIG. 8; the float-actuated trap door is shown in closed position.

As shown in cross-section in FIGS. 9 and 10, divider 10 can be enclosed as part of a storm water collection tank, having side walls 36, top wall 38, and bottom wall 40, defining an essentially closed system other than as will be indicated subsequently. As is typical of such design, the storm water collector is provided with inlets 42 and/or ground level inlet 44 and water outlet 46. In the usual design where there is one or more water inlet 42 and outlet 46, the outlet is positioned such that the bottom of the outlet is lower than the bottom of the inlet. Divider 10 is positioned in storm water collector such that the surface 20 of second or lower step 14, is essentially at the same level as the bottom of outlet 46. Where the water collector is provided with water inlets 42, the surface 18, of the first or higher step 12, should be level with or slightly below the bottom of such inlet 42, but, of course, above the surface of step 14. Where the water collector is provided with a ground level entrance 44, it is quite important that the discharge should be provided with a deflector 48 such that water discharging through 44 into the storm water collector will be generally deflected to fall onto trap door 24 in step 12.

Certain optional modifications of the novel divider of the present invention are illustrated in FIGS. 5 and 6. To ease in the operation of the system, air vents may be incorporated so that air can pass into any chamber beneath the divider and preclude a vacuum or vapor lock underneath. In FIGS. 5 and 6, the device is shown with four such air vents 30. The device is also shown with optional oil clean-out 32.

In normal operation, storm water enters the storm water collector inlets 42 or 44. At the beginning of the storm, trap door 24 is sitting in a normally open position so that water entering the storm water collector will be directed by and flow down the surface of the trap door into the lower section of the storm water collector, under the surface 18 of higher step 12. At this point, the water flowing under surface 18 impinges on deflector 50, which may be merely a continuation of surface 18, having a bend in a reverse direction, or may be a separate deflector attached for that purpose. This deflector causes a reversal of direction of the water flowing into the lower part of the storm water collector leading to a dissipation of energy, and causing the storm water flowing there through to go from turbulent flow to laminar flow. Grit particles entrained in the storm water, shown generally as 52 in FIG. 9, tend to drop out of the storm water and settle to the bottom 40. As the system fills up with water, oil, gasoline, and the like rise to the surface. As the liquid level reaches float 28, float 28 tends to rise, closing trap door 24 and ultimately shutting off access to the lower part of the storm water collector. Incoming water then continues across surface 18 of step 12, flows onto surface 20 of lower step 14, and out through outlet 46. Water from which most of the grit, gas and oil has been separated remains free to flow up into extender conduit 34, and will also then tend to flow across surface 20 to the outlet 46. Extender conduit 34 is placed so that the lower inlet into the extender will be below the level of accumulated gas, oil, et cetera, floating on the surface of the water retained in the lower part of the storm water collector. This gasoline and oil can be pumped out through the optional oil clean out 32, or trap door 24 may be made easily removable and a suitable pumping mechanism may be installed through a ground level entrance such as inlet 44. The storm water collector may also be provided with an optional clean out cover 54; the clean out cover can be removed and a tube can be inserted down through extender 34 to pump out water and, if necessary, sediment that accumulates in the lower portion of the storm water collector. The storm water collector may also be optionally provided with seepage outlets 56 so that standing water in the storm water collector may disperse into the soil beneath. An ordinary gas/oil absorption mat can be placed over the seepage holes to make certain that such hydrocarbons do not escape into the soil.

A further option for the present invention is illustrated in FIG. 3. In this case, the trap door 24 illustrated in FIGS. 2, 4, and 5 through 10, can be replaced by a ramp-type 29 structure or other rigid, sloping diverter Instead of pivot points or hinges, the ramp is fixedly attached to the base portion of divider 10 by any suitable means known to the art. As with the trap door, the ramp should be limited such that the angle of the water flow down the ramp with the horizontal line of flow is not more than about 30 degrees, and is preferably about 20 to 25 degrees. In the case of the ramp option, until the lower section of the storm water collector under the surface 18 of higher step 12 fills up, the system will operate and act for the purpose of separating grit and other materials much in the same way as described with the trap door embodiment. However, once the system fills up, there is nothing to shut off or close the entrance into the lower section of the storm water collector, and storm water entering the storm water collector through inlets 42 or 44 will simply overflow out conduit 46. At this "full" stage, however, there is the real possibility that some of the oil and/or gasoline that accumulated in the lower section of the storm water collector may overflow and/or be entrained in the in-rushing storm water and be carried out to conduit 46. Thus, while the embodiment of FIG. 3 is every bit as useful as the one illustrated with the trap door of FIG. 2 when grit or other sediment is the primary concern, or where the storm water load is less than the full capacity of the lower section of the storm water collector, the trap door embodiment of FIG. 2 is preferred for most purposes.

The size and number of storm water collectors equipped with the dividers of the present invention will, of course, depend on the particular needs of any given community. As a matter of general design, however, and in order to ensure adequate treatment of the initial storm thrust, the volume of the storm water collector beneath the divider of the present invention should be at least equal to the volume of storm water runoff represented by one-half inch of water standing on the area of expected runoff for that particular storm water collector.

We claim:

1. A storm water receptor comprising:

(a) a storm water receiving container comprising a top, a bottom, and at least one side wall and having at least one storm water inlet and having at least one water discharge outlet in a side wall of said storm water receiving container, said water discharge outlet positioned substantially above the bottom of said storm water receiving container, but with the bottom of said water discharge outlet positioned below the level at which storm water enters said storm water receiving container;

(b) a divider for said storm water receiving container dividing said container into an upper chamber containing said storm water inlets and discharge outlets, and a lower chamber, said divider comprising an upper step and a contiguous lower step, said upper step positioned, relative to all storm water inlets, such that storm water entering said storm water receiving container is directed onto the upper side of said upper step, and the upper surface of the lower step is at essentially the same level as the bottom of said water discharge outlet, said upper step provided with an opening communicating between said upper chamber and said lower chamber;

(c) a first storm water diverter in said lower chamber beneath said opening in said upper step, but above the bottom of said lower chamber, sloping downward into said lower chamber generally away from said storm water inlet and in the general direction of said water outlet;

(d) a second storm water diverter in said lower chamber between the lower end of said first diverter and the bottom of said lower chamber, and positioned to impede the flow of storm water flowing down said first storm water diverter and to reverse the direction thereof, thereby causing the storm water flowing downward from said upper chamber into said lower chamber to go from turbulent flow to laminar flow; and (e) conduit means communicating between said upper chamber and said lower chamber through said lower step, whereby water accumulating in said lower chamber can overflow to the upper surface of said lower step and pass out through said water discharge outlet.

2. A storm water receptor in accordance with claim 1 wherein said first storm water diverter (c) comprises a hinged trap door pivotably mounted to said upper step at the edge of said step closest to said storm water inlet and tending to pivot downwardly therefrom; a stop means for said trap door restricting the descent of said trap door to an angle of not more than about 30 degrees; said trap door provided with a float affixed to the underside thereof.

3. A storm water receptor in accordance with claim 2 having a storm water inlet in a side wall of said storm water receiving container.

4. A storm water receptor in accordance with claim 3 having a storm water inlet in the top of said storm water receiving container and having a storm water defector to deflect water entering said container onto said trap door.

5. A storm water receptor in accordance with claim 2 having a storm water inlet in the top of said storm water receiving container and having a storm water defector to deflect water entering said container onto said trap door.

6. A storm water receptor in accordance with claim 1 having a storm water inlet in a side wall of said storm water receiving container.

7. A storm water receptor in accordance with claim 5 having a storm water inlet in the top of said storm water receiving container and having a storm water defector to deflect water entering said container onto said trap door.

8. A storm water receptor in accordance with claim 1 having a storm water inlet in the top of said storm water receiving container and having a storm water defector to deflect water entering said container onto said trap door.

* * * * *